April 18, 1939.  F. O. CONILL  2,155,115

HAIR WAVING APPARATUS

Filed Oct. 30, 1936  6 Sheets—Sheet 1

Inventor
FERNAN O. CONILL

By Semmes & Semmes
Attorneys

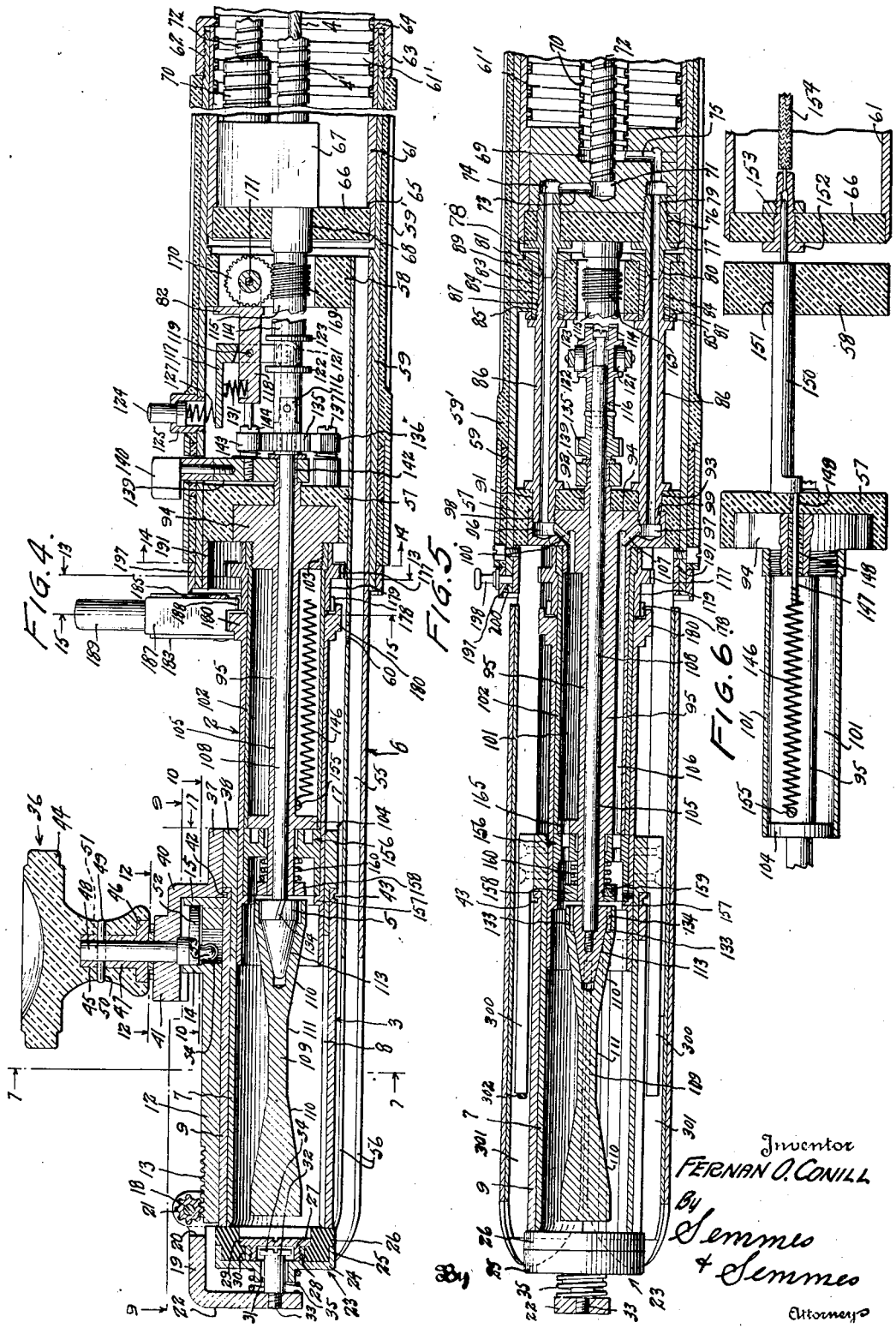

April 18, 1939. F. O. CONILL 2,155,115

HAIR WAVING APPARATUS

Filed Oct. 30, 1936 6 Sheets-Sheet 3

Inventor
FERNAN O. CONILL

By Semmes & Semmes
Attorneys

April 18, 1939.  F. O. CONILL  2,155,115
HAIR WAVING APPARATUS
Filed Oct. 30, 1936   6 Sheets-Sheet 4
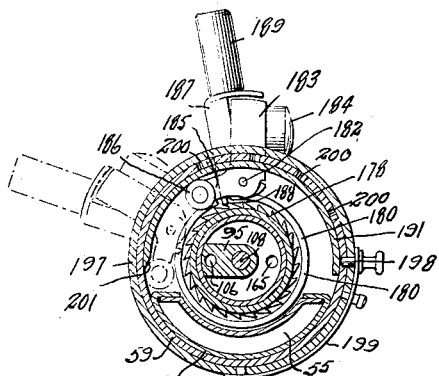
FIG. 13
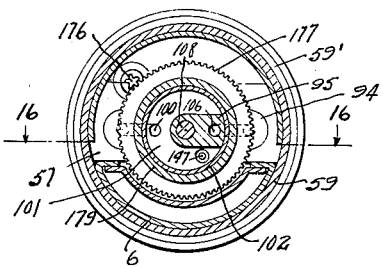
FIG. 14.
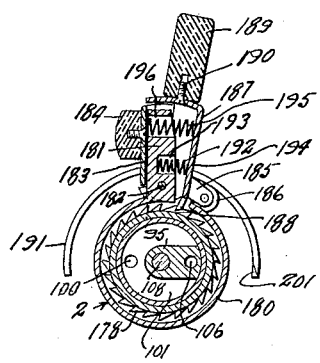
FIG. 15.
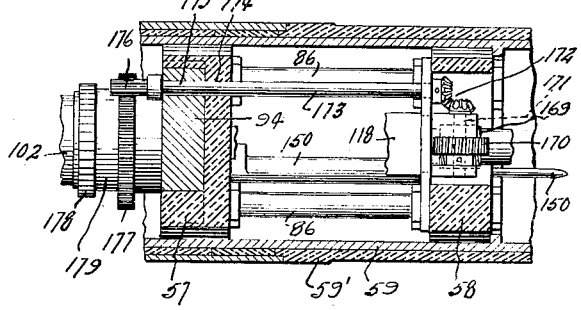
FIG. 16.
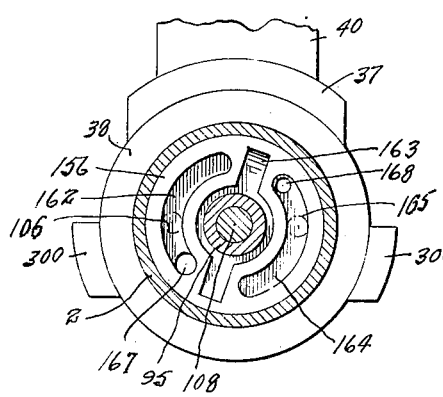
FIG. 17.   FIG. 18.
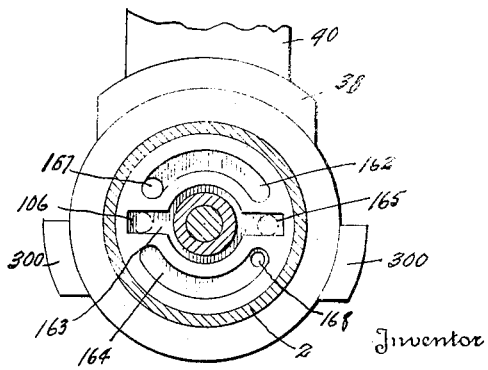
Inventor
FERNAN O. CONILL
By Semmes & Semmes
Attorneys

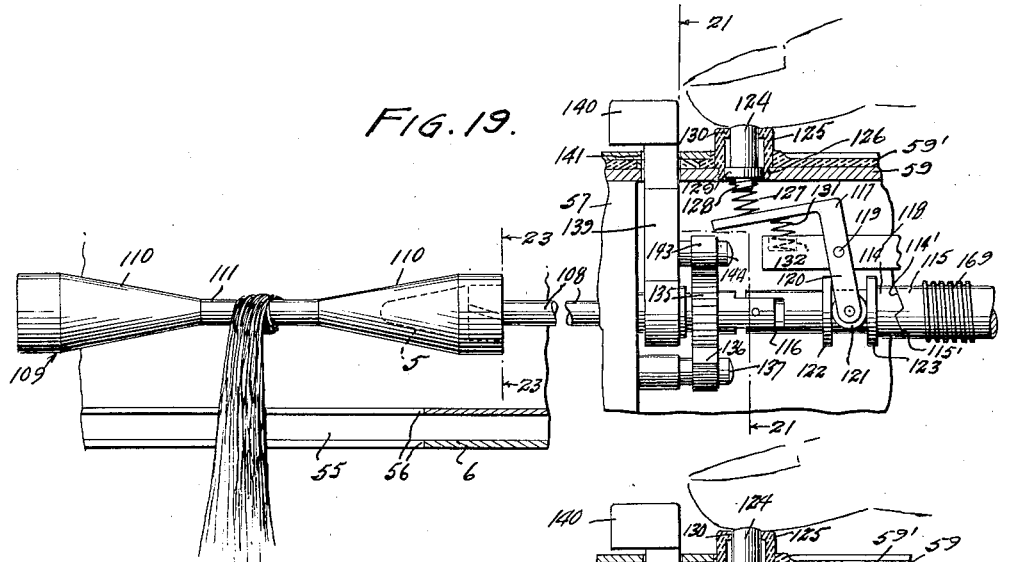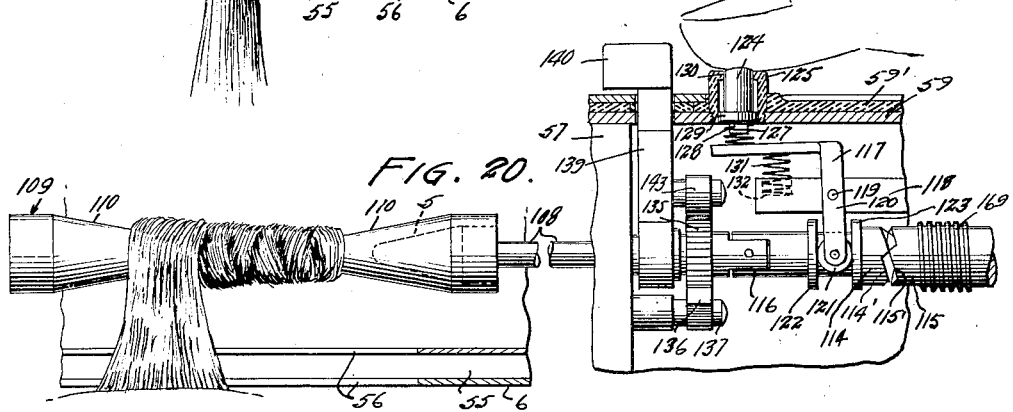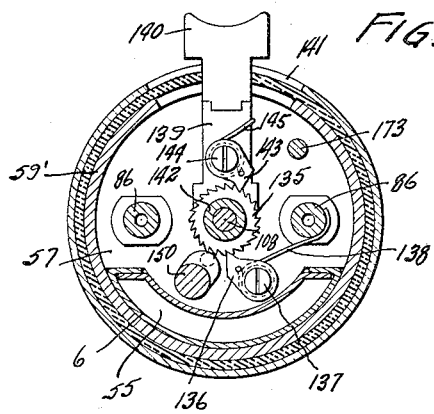

April 18, 1939.   F. O. CONILL   2,155,115
HAIR WAVING APPARATUS
Filed Oct. 30, 1936   6 Sheets-Sheet 6
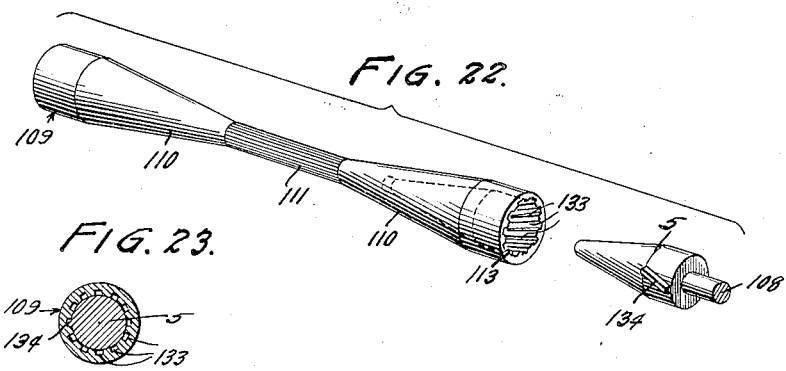
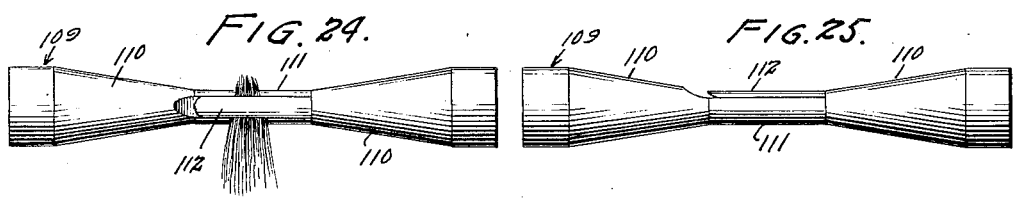
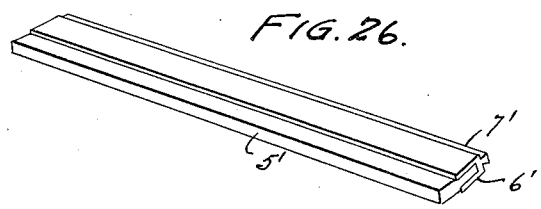
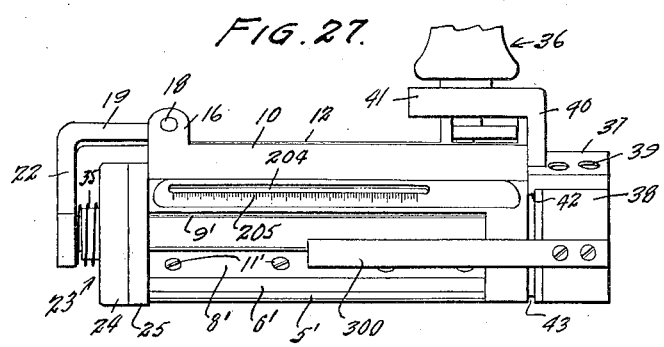
Inventor
FERNAN O. CONILL
By Semmes & Semmes
Attorney Patented Apr. 18, 1939

2,155,115

UNITED STATES PATENT OFFICE 2,155,115

HAIR WAVING APPARATUS

Fernan O. Conill, New York, N. Y.

Application October 30, 1936, Serial No. 108,485
In France April 28, 1936

28 Claims. (Cl. 132—36)

This invention relates to a hair waving apparatus, and more particularly to apparatus for making the so-called permanent waves.

An object of my invention is to provide a device which will simplify and increase the safety or security of the waving operation.

Another object of my invention is to provide a device by which the hair is automatically wound on a curling member.

A further object of my invention is to provide a hair waving device by which the hair is automatically wound on a curling member and cut off when the hair is completely wound on the member.

A still further object of my invention is to provide a hair waving device in which a heating medium is circulated around the hair for a predetermined period.

With these and other objects in view, which may be incident to my improvements, the invention consists in the parts and combinations to be hereinafter set forth and claimed, with the understanding that the several necessary elements comprising my invention may be varied in construction, proportions and arrangement, without departing from the spirit and scope of the appended claims.

Described in general terms, my device is composed of a handle which supports a steam heating chamber, a hair curling chamber, and a guard on one of the ends thereof.

A curling member on which the hair is adapted to be wound is removably positioned within the heating chamber. A suitable source of power extends through the handle and into the chamber for rotating the curling member to wind the hair thereon.

Suitable mechanism is provided within the handle for automatically disengaging the curling member from the source of power when the lock of hair is wound on the curler. In addition, a manually operated device is also provided on the handle for tightening the hair on the curler.

Also extending through the handle and in communication with the heating chamber are a plurality of conduits for directing a flow of superheated vapor into the chamber for heating the hair. The entry of vapor into the chamber is controlled by means of a valve which is interposed in the conduits.

Due to the fact that the vapor should enter into the heating chamber at the moment of operation and continue for a predetermined time, means are provided for regulating the duration of the circulation. The means for actuating the valve is determined by the constant speed of the motor.

In order to make my invention more clearly understood, I have shown in the accompanying drawings means for carrying the same into practical effect without limiting the improvements in their useful applications to the particular constructions which, for the purpose of explanation, have been made the subject of illustration.

In the drawings:

Figure 4 is a vertical longitudinal sectional view of my device.

Figure 5 is a horizontal sectional view of my device.

Figure 6 is a detail view of the electrical resistance for superheating the vapor in the incoming conduit.

Figure 13 is a view taken along lines 13—13 in Figure 4.

Figure 14 is a view taken along lines 14—14 in Figure 4.

Figure 15 is a view taken along lines 15—15 in Figure 4.

Figure 16 is a view taken along lines 16—16 in Figure 14.

Figure 17 is a view taken along lines 17—17 in Figure 4.

Figure 18 is a view similar to Figure 17 showing the valves with the incoming and outgoing conduits in direct communication.

Figure 19 shows in section the manner in which the hair is wound on the bobbin.

Figure 20 shows in section the hair after it is completely wound on the bobbin.

Figure 21 is a view along lines 21—21 in Figure 19.

Figure 22 is a view in perspective showing the bobbin and live center.

Figure 23 is a view taken along lines 23—23 in Figure 19.

Figure 24 is a side elevation of a modified form of bobbin.

Figure 25 is a top plan view of the bobbin in Figure 24.

Figure 26 is a perspective view of the resilient strip which is provided in the elongated aperture in the curling chamber.

Figure 27 is a detail view showing a temperature indicating device provided on the bobbin casing.

Figure 1:
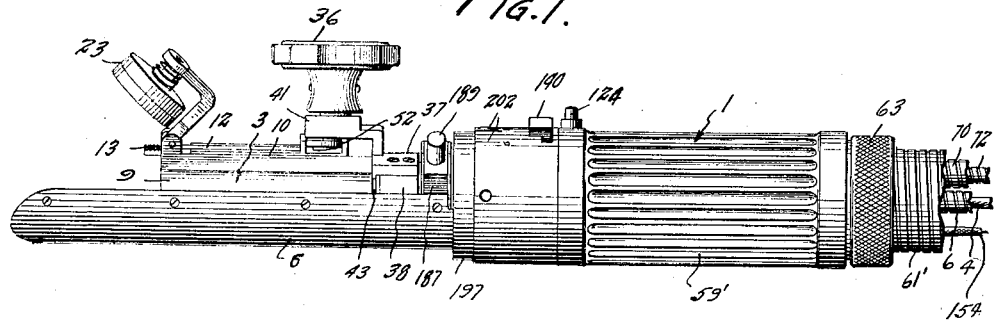
Figure 1 is a side elevation showing the device in position for receiving a lock of hair to be waved.

Referring to the drawings, and more particularly to Figure 1, my hair waving device broadly comprises a handle portion 1, a vapor superheating chamber 2 and a hair heating chamber 3. As shown in Figure 4, a flexible transmission or drive shaft 4 extends through the handle, vapor chamber and terminates in a spindle 5 which projects into the hair waving chamber 3. The drive shaft may be connected with any suitable source of power, such as an electric motor, not shown. A flexible sheathing 4' surrounds the drive shaft for the usual purposes.

Positioned below and extending longitudinally of the hair chamber 3 and the vapor heating chamber 2 and extending into the handle is a metallic guard or trough 6 of arcuate shape. The trough is used as an insulator for protecting the head of the person having her hair waved and also as a conduit for drawing in air by an aspirating means, to be hereinafter more fully described.

The heating chamber, that is, that chamber in which the hair is placed for being subjected to the action of vapor, comprises a longitudinally movable cylinder 7 having a longitudinal aperture 8. As will later become more apparent, the aperture 8 permits the entry of the hair within the chamber.

As shown in Figure 4, the cylinder 7 is slidably mounted and supported on the vapor superheating chamber 2.

A sleeve 9 having an open portion 9' is mounted on and adapted to move around the cylinder 7.

Figure 8:
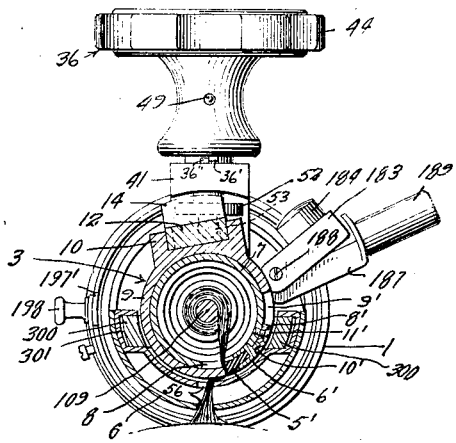
Figure 8 is a view similar to Figure 7 showing the parts when the heating chamber is closed.
Figure 9:
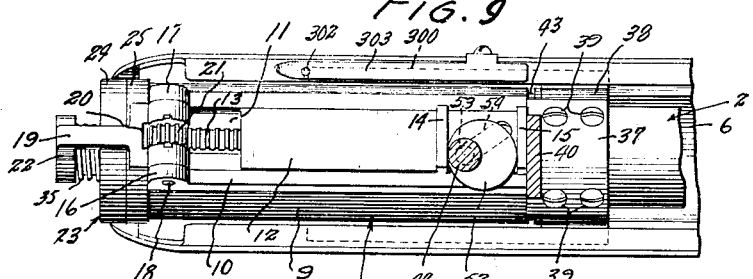
Figure 9 is a view taken along lines 9—9 in Figure 4.
Figures 10, 11:
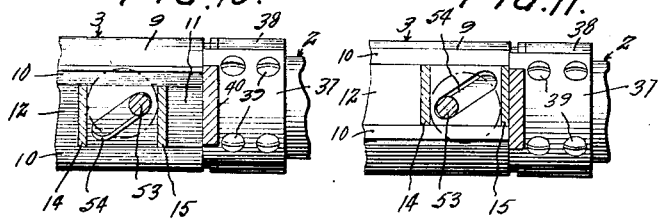
Figure 10 is a view taken along lines 10—10 in Figure 4.
Figure 11 is a view similar to Figure 10 showing the parts in the position shown in Figure 8.
Figure 12:
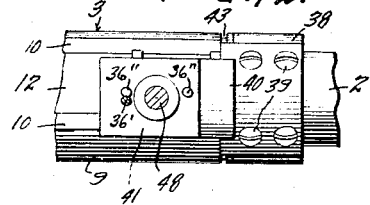
Figure 12 is a view taken along lines 12—12 in Figure 4.

Secured to one of the faces of the aperture 8 is a strip of resilient material 5'. The resilient strip will provide a clamping member for the hair so that the scalp will not be injured, as shown in Figure 8.

Figure 7:
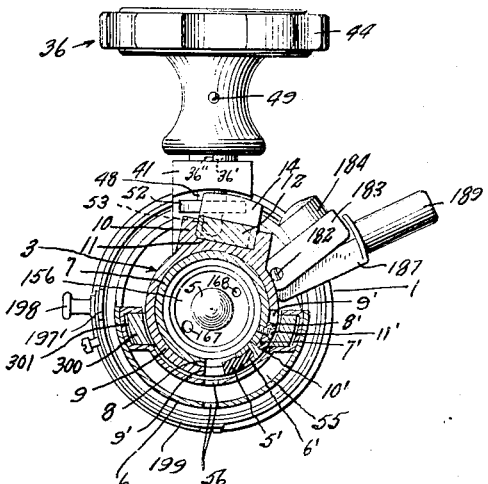
Figure 7 is a view taken along lines 7—7 in Figure 4.

As shown in Figure 26, the resilient material is preferably fixed in a metallic holder 6' of channel shape. The casing is provided with a dovetail key 7'. Referring to Figures 7 and 8, it can be seen that when the casing is placed adjacent the face of the aperture, the inner peripheries of the cylinder 7 and the holder 6' are concentric.

In order to secure the resilient strip to the cylinder 7, a metal strip 8' having a shoulder 10' which fits over the dovetail 7' is secured to the cylinder by a screw 11'.

It will be appreciated that, when the resilient strip 5' becomes worn, by merely removing the screw 11' the casing 6' can be removed and a new strip inserted therein.

The upper portion of the sleeve is of rectangular configuration, as shown at 10, and is provided with a longitudinal recessed or grooved portion 11.

A slide member 12 having a rack 13 at the forward end is slidably mounted in the groove 11. The other extremity of the slide is provided with a pair of spaced vertical members 14 and 15, the purpose of which will be later described more fully.

A pair of ears 16 and 17 are formed on the forward portion of the rectangular member 10. Extending between the ears and pivotally mounted on a pin 18 is an arm 19 which is bifurcated as at 20. A pinion 21 which meshes with the rack 13 on the slide 12 is positioned in the bifurcation. The arm 19 is bent inwardly as at 22. The bent portion 22 of the arm 19 supports a shutter designated generally 23, which serves for opening and closing the open end of the heating chamber 3.

As clearly shown in Figure 4, the shutter 23 consists of a metallic cap 24 having an annular flange 25. A rubber washer or gasket 26 of sufficient size to completely seal the open end of the chamber is fitted within the cap 24. A bolt 27 screw-threaded into aperture 28 provided in the cap 24 will keep the rubber gasket 26 in proper position. It should be noted that the head 29 of the bolt 27 is of a size sufficient to fit over the shoulders 30 of the gasket and will prevent the gasket from working loose.

Fitting within the aperture 28 and extending through the opening 31 in the cap 24 is a bolt 32. The end of the bolt 32 is suitably secured to the portion 22 of the arm 19 as shown at 33. As in the case of the bolt 27, the bolt 32 is provided with a head 34 which is of sufficient diameter so that it will not come through the aperture 31.

A coil spring 35 is provided between the arm 22 and the cap 24. One end of the spring is suitably fitted to the arm and the other end thereof is fitted over the aperture 31. As will be readily appreciated, the spring will give flexibility to the valve and urge the rubber gasket tightly against the open end of the heating chamber 3.

The mechanism for operating the opening and closing of the shutter 23 and the moving of the sleeve 9 is best depicted in Figures 4 and 7 to 12 inclusive.

Suitably mounted on the rear portion of the cylinder 7 is a control button designated 36. The control mechanism comprises a supporting member 37 which is mounted on an enlarged portion 38 of the cylinder 7. The member 37 is secured to the member 38 by means of screws 39. The base comprises an upright member 40 and a horizontal member 41 which is integral therewith. The upright is provided with a flanged portion 42 which fits into an annular groove 43 provided around the outer periphery of the sleeve 9. The member 40 will tend to limit the rearward movement of the slide 12 due to the engagement of the member 15 with the upright portion 40.

An actuating button 44 of non-conductive material is provided with a recessed portion 45 having shoulders 46. Fitting into the recessed portion is a metallic sleeve 47. A shaft 48 fits within the sleeve 47. A pin 49 extends through apertures 50 and 51 in the button 44 and the shaft 48 respectively. The pin will keep the button fixed on the shaft.

Mounted adjacent the other extremity of the shaft is an eccentric 52. The diameter of the eccentric is such that it will fit tightly between the vertical members 14 and 15 on the slide 12.

Carried on the extremity of the shaft 48 is a finger 53 which is movable in a cam slot 54 provided in the upper face of the slide 12.

The shutter 23 is opened and the sleeve 9 is moved about the cylinder 7 by a single movement of the control button 44.

When the button is turned, the slide 12 is moved forward and the rack 13, which is in engagement with the pinion 21, causes the arm 19 to be moved about the pivot 18 and lift the rubber gasket from the open end of the cylinder 7. Simultaneously, the the finger 53 carried by the shaft 48, by moving in the cammed slot 54 acts upon sleeve 9 and moves the sleeve to the position shown in Figure 7.

When it is desired to close the shutter 23, the button is turned and the rack is moved backwardly, causing the pinion to move about the pivot 18 and carry the arm downwardly to the position shown in Figure 4, thereby closing the open end of the cylinder. At the same time, the finger 53, moving in cammed slot 54, will move the sleeve 9 to the position shown in Figure 8.

Limit pins 36' and 36" are fixed in the knob sleeve 47 and bracket 41 respectively to limit movement of control button 36 to one half turn.

To prevent rotary displacement of the cylinder 7 upon actuation of the button 44 and also to limit the longitudinal movement of the chamber 2, there are provided keys 300 suitably attached to opposite sides of the rear portion 38 of cylinder 7. These keys slide in grooves 301 formed in the member 6. A stop 302 is attached by a spring 303 to the member 6 near its forward end. This stop, as will be seen by reference to Figures 5 and 9, will limit the forward movement of the cylinder 7. However, should it be desired to remove the chamber 2, the spring 303 and stop 302 may be lifted out of the path of the key 300.

It will be readily appreciated from the foregoing that, in the open position, access can be had to the interior of the hair curling chamber 3 and the hair can be placed upon the spindle 5 for further treatment.

As has been hereinbefore pointed out, a trough 6 is positioned below and extends longitudinally of the hair curling chamber 3 and the steam chamber 2. The trough is of arcuate shape and is so pressed as to form a conduit 55. The trough is also provided with a pair of aligned apertures 56 which are formed directly below the aperture in the cylinder 7 and the cutaway portion of the sleeve 9. As is apparent, when the parts are in the position shown in Figure 7, the hair may be placed within the hair curling chamber.

The trough extends into the handle 1 and is held in position by frictional contact with the support elements 57 and 58 and the metal sleeve 59 which forms the main portion of the handle 1. The sleeve 59 is preferably covered with a coating of hard rubber, Bakelite or the like 59'. An aperture 60 is provided in the upper portion of the trough for permitting any condensation or moisture to be aspirated from the interior of the device by the employment of any suitable aspirating means (not shown). Moreover, this trough will serve as an insulation for the scalp and the air sucked in through the conduit will also cool the head.

Fitting within the sleeve 59 is another smaller sleeve 61. The relative diameters of the sleeves 59 and 61 are such that the sleeve 61 will fit snugly within the sleeve 59. The sleeve 61 is used as the aspirating conduit and is connected with a suitable suction mechanism through a flexible conduit 61'.

As best shown in Figure 4, the sleeve 59 is provided with screw threads 62. A screw threaded cap 63 having inturned edges 64 is adapted to be threaded onto the threads 62. As will be discussed more fully, by removing the cap 63 the apparatus can be detached for various purposes, such as cleaning, repairing, and replacing parts.

The inner sleeve 61 is provided on its inner periphery with shoulders 65. Fitting within the shoulders 65 is a supporting member 66 of a non-conductive material. Adjacent the member 66 is a metallic plug 67. The drive shaft 4 extends through an aperture in the plug 67 and through a bearing 68 in the member 67.

As clearly shown in Figure 5, the plug is provided with a central channel 69. A flexible conduit 70 fits within the channel 69. A second channel concentric with the channel 69 of lesser diameter than the said channel 69 is also provided therein. A second flexible conduit 72 fits within the channel 71. The flexible conduits 72 and 70 serve for conducting the heating vapor to and from the hair heating chamber 3, as will later become more apparent.

Extending at right angles to the channel 71 is a passageway 73 which empties into chamber 74. A second passageway 75 of substantially L shape empties into the channel 69.

Extending through a pair of apertures 76 in the support member 66 are a pair of fittings 77. The fittings 77 are adapted to be screw threaded into apertures 78 in the plug 67. As shown in Figure 5, each fitting is provided with a central bore 79 which, when screwed into the plug 67, is in direct communication with the passageway 75 and the chamber 74. Each fitting is provided with a tapered end 80, the purpose of which will be later described more fully.

The sleeve 59 is provided with an internal annular flange 81 against which is positioned a support member 58 of non-heat-conductive material as shown in Figures 4 and 5. As can be readily seen, the member 81 is of the same diameter as the sleeve 61. Extending through apertures 83 in the member 58 are a pair of metallic bushings 84 having internally threaded ends 85. The diameter of the bushings is such that the tapered end portion 80 of the fittings 77 will fit snugly therein.

A pair of metallic tubes 86, having a screw threaded portion 87 adjacent one of its ends and ending in an extension 89, is adapted to be screw threaded into the bushing. As clearly shown in Figure 5, when the sleeve 61 is inserted in the handle, the tapered ends 80 of the fittings 77 will form a tight union with the tapered extensions of the tubes 86.

Fitting within the sleeve 59 is another supporting member of non-heat-conductive material 57. The member 57 is provided with a plurality of apertures 91, 92 and 93. Extending through the apertures 91 and 93 are the other ends of the tubes 86. Tightly fitting within the supporting member 57 is an enlarged end portion 94 of the central support member 95. The member 95, as will later become more apparent, serves as a support element for heating chamber 2.

Chambers 96 and 97 are provided in the member 94. The extremities of the chambers 96 and 97 are screw threaded, as at 98, for receiving the screw threaded ends 99 of the metallic tubes 86.

Extending from the chamber 96 is a passageway 100 which empties into a conduit 101. The conduit 101 is formed between the member 95 and a cylinder 102. The cylinder 102 is screw threaded at one end on a shoulder 103 provided on the member 94. The other extremity of the cylinder 102 is fitted snugly around a flanged portion 104 provided on the member 95. The cylinder 102 serves as the steam chamber 2. The member 95 is provided with a pair of longitudinal bores 105 and 106. The chamber 97 communicates with the bore 106 through a passageway 107.

The bore 105 serves as a bearing for the non-flexible portion 108 of the drive shaft 4.

In order to wind a lock of hair rapidly on the bobbin 109, the bobbin is fitted onto the spindles 5. The bobbin comprises a cylindrical member which tapers downwardly from both extremities as at 110 to form a central portion 111. As shown in Figures 24 and 25, a spring member 112 may be provided at the portion 111. It will of course be appreciated that this spring will hold the hair on the bobbin.

One of the ends of the bobbin is recessed as at 113 in order that the bobbin can be fitted onto the spindle 5.

To prevent the traction exerted upon the hair from becoming painful, it is necessary that the bobbin be disengaged automatically from the source of power. To this end I provide a friction clutch arrangement on the drive shaft 108. As shown in Figures 19 and 20, this clutch comprises two notched members 114 and 115. The walls of the notches 114' and 115' are inclined slightly axially. The clutch member 114 slides parallel to the axis of the shaft 108. A coupling 116 is provided on the shaft 108 for allowing longitudinal movement of clutch member 114.

A lever arm 117 is provided for actuating the clutch. The lever arm 117 is pivotally connected to a supporting arm 118 as shown at 119. The arm 118 is suitably affixed to the support member 82.

The lever arm is bifurcated and clutch fingers 120 carry rollers 121 which work between the flanges 122 and 123 on the clutch member 114.

A control button 124 is slidably mounted in a sleeve 125. The sleeve 125 is screw threaded in an aperture 126 in the sleeve 59. The button 124 actuates the lever arm 117. A coil spring 127 secured at one end to an extension 128 on the base of the button 124 and secured at the other end to the upper face of the lever arm 117 normally keeps the button in the uppermost position. The annular flange 129 provided on the button is adapted to engage shoulders 130 on the sleeve 125 for preventing the withdrawal of the button through the open end of the sleeve.

A second coil spring 131 is fixed at one end in a recess 132 in the support 118 and the other end is secured to the lower face of the lever arm 117. This spring, that is, the spring 131, is of sufficient strength to keep the faces 114' and 115' of the clutch normally in a disengaged position, as shown in Figure 4.

When the button 124 is depressed, pivoting the lever arm about the point 119 and moving the face 114 into engagement with the face 115, movement will be transmitted from the shaft 4 to the bobbin 5 through the drive shaft 108.

After the hair has been completely wound on the bobbin, the shaft 108 will meet a resistance to its rotary motion. The effect exerted by the face 115' or that of the face 114' due to the incline of the faces, presents a component parallel to the axis which will tend to draw the face 114' away from the face 115' and thereby disengage the clutch and arrest rotation of the drive shaft 108. It is necessary, however, to accomplish the above result, that the face 114' of the clutch overcome the action of the spring 128. It will of course be readily appreciated that a spring of proper tension will permit a predetermined disengagement of the clutch whenever the tension exerted upon the hair becomes painful to the hair or scalp.

In order to further insure this, the bobbin is provided with a plurality of helical grooves 133 in the recessed portion 113. The grooves 133 are adapted to engage a helical tooth 134 provided on the outer periphery of the spindle 5.

It should be observed that the helices are inclined in a direction so that the bobbin will tend to be screwed onto the spindle 5 in the course of its rotation. In the event it becomes necessary to tighten the hair on the bobbin subsequent to the automatic winding thereof, I have shown in Figure 21, a manually operated mechanism for rotating the shaft 108. Mounted on the drive shaft 108 immediately forward of the coupling 116 is a ratchet 135. The backward movement of the ratchet is prevented by a pawl 136 suitably secured to the support 57 as at 137. A spring 138 having one end secured to the support and the other end fitted around the tube 86 holds the pawl in engagement with the teeth on the ratchet.

A lever arm 139 having an operating head 140 extends through an arcuate aperture 141 provided in the upper portion of the handle 1. The arm is pivotally mounted on a reduced extension 142 of the member 94. The arm 139 carries a pawl 143 which is secured thereto by a screw, as at 144. A spring 145 secured at one end to the pawl and having the other end fitting around the arm 139 tends to keep the pawl in engagement with the ratchet wheel.

It is believed apparent that, by moving the operating head 140 laterally, the pawl 143 will impart a step by step movement to the shaft 108 and wind the hair on the bobbin to the desired degree.

Inasmuch as the hair is clamped tightly between the resilient strip 5 and sleeve 9, there can be no injury to the scalp when the hair is wound by the manual arrangement.

From the foregoing it will be appreciated that I have devised both manual and automatic control means by which the hair may be wound upon a suitable curling member such as a bobbin. With this arrangement, it is possible to wind the locks very tightly and yet positively prevent any danger of injury to either the hair or scalp.

As hereinbefore pointed out, two concentric conduits 70 and 72 extend into the handle 1. The conduit 72, that is, the interior conduit, serves as an inlet for the heated vapor used for waving the hair. The vapor comes in the conduit 72 through passage 73, fitting 77, section 86, passageway 100, conduit 101 and into the heating chamber 3. The vapor leaving the chamber 3 goes out through the bore 106, passageway 107, section 86, fitting 77, passageway 75 and the conduit 70.

I have found that, by having the inlet conduit within the outlet conduit, there can be no condensation of the vapor.

In order to superheat the vapor within the steam chamber 2, I employ an electrical resistance 146 which is positioned within the chamber 101. A conductor 147 secured to one of the ends of the resistance extends through a bushing 148 and aperture 149 in the members 94 and 57, respectively. An offset portion 150 of the conductor 146 extends through an aperture 151 in the member 58. The conductor then extends into a screw threaded fitting 152 in the support 66. A nut 153 locks the fitting in place. A suitable electrical lead 154 extends into the fitting 152. The other end of the resistance is grounded as at 155 for completing the electrical circuit through the resistance.

The superheated vapor should enter the chamber 3 at the desired time and continue for a predetermined period, which will of course depend upon the nature of the hair being treated. Moreover, the vapor should be kept in circulation, as this will prevent condensation of the vapor in the conduit and also retain the heat within the walls of the chamber 3. In order to accomplish the above, the entry of the vapor in the chamber is controlled by means of a valve, depicted generally 156, positioned in tube 2 adjacent the flanged portion 104.

As shown in Figures 4 and 5, the valve is tightly fitted between the flange 157 on the tube 2 and the flanged portion 104 on the support 95 so as to form a steam-tight joint. A collar 158 is fixed to the extremity of the member 95 by a screw 159. A coil spring 160 is located between the collar 158 and the valve 156. The coil spring will urge the valve 156 tightly against the flange 104. As shown in Figures 17 and 18, the valve is provided with cavities 162, 163 and 164. The cavities 162 and 164 are of arcuate configuration and the cavity 163 has a circular central portion and elongated extremities.

The flanged portion 104 has an aperture 165 leading from the chamber 101 and communicating with cavities 163 or 164 and the termination of passage 106 which communicates with cavities 163 or 162.

Referring to Figure 18, it can be seen that the elongated extremities of the cavity 163 are positioned in the path of the openings 165 and 106. The heated vapor, therefore, coming through channel 101 goes through the member 165 to the cavity 163 and directly into the outlet passage 106. The cavities 162 and 164 are, at this point, positioned against the solid portion of the flange 104.

By turning the tube 2, however, to the position shown in Figure 17, it can be seen that the passages 165 and 106 communicate with the ports 168 and 167 through the cavities 164 and 162. It will be readily appreciated, therefore, that the circulation of the steam may be effected through the hair waving chamber 3.

As heretofore pointed out, the duration of the circulation of the heated vapor throughout the chamber 3 around the bobbin is actuated by a predetermined constant speed of the motor.

In order to accomplish this, the clutch member 115 which is driven by the drive shaft 4 is provided with a worm 169 which meshes with a worm wheel 170 carried by shaft 171. Also carried by shaft 171 is one gear of the beveled gearing 172. The other gear is mounted on a shaft 173 which extends through openings 174 and 175 in the support members 57 and 94, respectively. The shaft 173 carries a pinion 176 at its other extremity. The pinion meshes with the gear 177. The gear 177 and a ratchet 178 are formed on a sleeve 179 which is rotatably mounted on the tube 102.

It will of course be readily appreciated that as long as the drive shaft 4 is connected with a source of power, the gear 177 and the ratchet 178 will be continuously rotating.

The rear extremity of the tube 2 is provided with an annular flange portion 180. As shown in Figure 15, the tube 2 is provided with a radial extension 181. Pivotally connected to the extension 181 as at 182 is a cam follower member 183 having an operating button 184. The cam follower is provided with a stirrup shaped member 185 which carries a roller 186.

Also pivotally mounted on the pivot 182 is a pawl arm 187 having a pawl 188 at its lower end. A button 189 is secured to the top of the pawl arm by a screw, as at 190. The roller 186 is adapted to travel in a track formed by the tube 2 and a cam guide 191 which is provided on the forward end of the handle portion 1.

As shown in Figure 15, the pawl 188 is kept in engagement with the ratchet 178 by means of a spring 192. One end of the spring 192 is seated in a recess 193 in the extension 181 and the other end is fixed to the inner wall of the pawl arm 187, as shown at 194.

A second spring 195 is positioned above the spring 192 between the members 183 and 187 passing through an aperture 196 in the extension 181. It will be apparent that this spring tends to keep the roller 186 in engagement with the cam guide 191.

Figure 2:
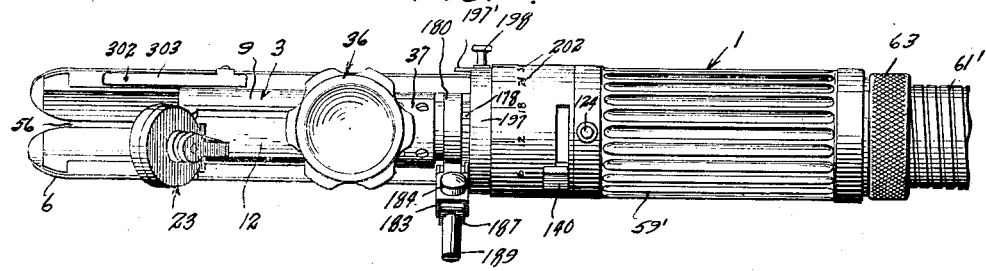
Figure 2 is a top plan view of Figure 1.
Figure 3:
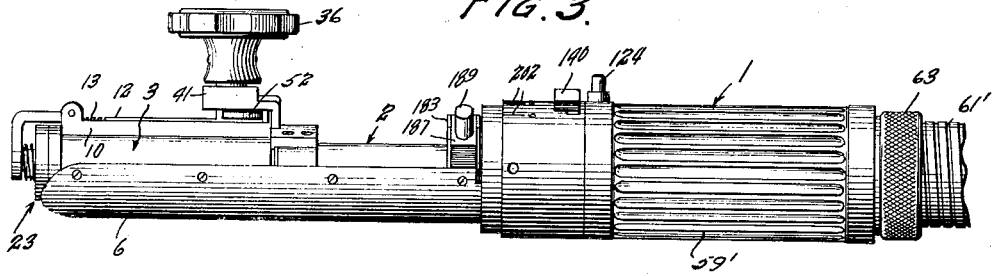
Figure 3 is a side elevation showing the device in position for waving a lock of hair.

Referring to Figures 2, 7 and 13, I have shown a circular movable band 197 having a stop lug 197' positioned on the forward portion of the handle 1. Suitably secured to band 197 by means of a spring 199 is a pin 198. It should be observed that the stop member 197' is in the path of the pawl arm 187.

A plurality of apertures 200 are provided around the circumference of the sleeve 59. These apertures will permit the stop 197' to assume any desired position.

The operation is as follows. After an examination of the hair to be waved, if it is found that it is necessary to expose the hair to the action of the superheated vapor for, let us say, ten seconds, the pin 198 is fitted into the aperture which corresponds to that period. In other words, the stop is placed in such a position that it will require ten seconds for the pawl arm to move from the stop to the cam portion 201 of the guide 191.

The pawl arm is moved about the pivot 182 so as to withdraw the pawl 188 from the teeth of the ratchet wheel. The pawl arm is then freely movable.

The pawl arm is then placed in contact with the stop 197'. The handle 189 is released, and the spring 195 urges the pawl 188 into engagement with the teeth on the ratchet wheel 178.

As has been hereinbefore pointed out, in view of the fact that the ratchet is continuously rotating, it will move the pawl arm along with it. Likewise, the pawl arm will cause the tube 2 to be moved. At the same time, the valve 156 which is frictionally held within the tube 2 will also be moved.

When the roller 186 finally arrives at the portion 201 and falls therein, the pawl 188 is disengaged from the teeth of the ratchet due to the action of the spring 192. This will cease movement of the pawl member and the tube.

The arrangement is such that, when the roller is in the portion 201, the valve 156 assumes the position shown in Figure 18. In other words, it is in the position in which the vapor does not circulate throughout the bobbin chamber.

For all other positions between the stop and the portion 201, it will be readily appreciated that the vapor will circulate throughout the hair heating chamber 3.

It can be seen, therefore, that the hair is exposed to the action of the superheated vapor only during the period that the pawl arm is passing from the stop 197' to the portion 201. The vapor can be circulated for any desired period of time by merely positioning the stop 197' in the necessary position. For facilitating the positioning of the stop, the handle may carry a graduation in seconds, such as shown at 202 in Figure 2.

While the hair of the same person is being waved, the stop 198 can be left at the same position.

Referring to Figure 27, I have shown a thermometer 204 having a graduation 205 suitably affixed to the hair heating chamber 3. This arrangement will permit the operator to ascertain the degree of temperature attained by the hair within the heating chamber.

As best shown in Figure 5, the device may be dismounted by merely removing the screw cap from the end of the sleeve 59. The sleeve 61, plug 67, flexible conduits 70 and 72, support element 73, fitting 77 and the drive shaft down to the face 115 of the clutch may be then withdrawn from the sleeve 59.

It will be quite apparent that in so dismantling the handle, the device can be readily cleaned, repaired or have any working parts replaced.

The complete operation of my hair waving apparatus may be briefly summed up as follows: The hair heating chamber is opened by turning the control button 44. This opens the shutter 23 and the longitudinal aperture 8. The bobbin 109 can then be positioned in the spindle 5 for winding the hair thereon.

When the bobbin is secured to the spindle, the operator depresses the button 124 which, through the forked arm 117, moves the clutch face 114' into engagement with the face 115'. The drive shaft 4 then transmits a rotary motion to the spindle 5 and winds the hair on the bobbin.

When the hair is wound completely on the bobbin, the traction exerted by the hair causes the clutch to slip and thereby draw the face 114' away from face 115' and arrest rotation of the spindle.

As the hair is now wound on the bobbin, the button 44 is again turned, and closes the shutter 23 and the aperture 8, gripping the lock of hair tightly in the aperture 8. The hair is now ready for being subjected to the superheated vapor.

After it is determined how long it is necessary to subject the hair to the vapor, the stop is placed in the aperture corresponding to that period of time. The pawl arm 187 is then moved back against the stop.

The valve is now in the position shown in Figure 17 and the vapor continues to circulate throughout the interior of the chamber 3 until the roller falls into the portion 201 and ceases movement of the tube 2.

The valve is then in the position shown in Figure 18, and the vapor goes directly from the incoming conduit 165 to the outgoing conduit 106 and does not circulate within the chamber.

As is well known, hair which is very tightly wound can be waved in much less time than hair which is not wound tightly. In order to keep the hair always wound tightly on the bobbin, the lever 139 will permit the manual winding of the bobbin, by rotating the shaft through the pawl and ratchet mechanism.

When the hair has been subjected to the vapor for the necessary time, the button 44 is again turned for opening the chamber 3 and the bobbin with the waved hair is removed from the spindle and suitably clipped on the bobbin until sufficiently dry for further treatment, such as setting the wave. Then the next lock of hair to be waved is placed in the chamber and the foregoing steps are repeated.

It is believed apparent from the foregoing description that I have provided a hair waving apparatus that will simplify and materially increase the safety of the waving process. Moreover, by having both automatic and manually operated mechanisms for winding the hair on the bobbin, the waves can be produced in less time than the waves made by the present apparatus.

In addition, the trough positioned below and extending longitudinally of the hair waving chamber and the steam chamber will not only protect the scalp, but will also serve as an aspirating conduit for removing any condensation which might form within the device.

While I have shown and described the preferred embodiment of my invention, I wish it to be understood that I do not confine myself to the precise details of construction herein set forth by way of illustration, as it is apparent that many changes and variations may be made therein, by those skilled in the art, without departing from the spirit of the invention, or exceeding the scope of the appended claims.

I claim:

1. In an apparatus for waving hair, a heating chamber, a curling member adapted to be positioned in said chamber, means to rotate the curling member to wind a lock of hair thereon, and automatically actuated means to circulate a heating medium throughout the heating chamber.

2. In an apparatus for waving hair, a heating chamber, a curling member adapted to be positioned in said chamber, means to rotate the curling member to wind a lock of hair thereon, and automatically actuated means to circulate a heating medium throughout the heating chamber for a predetermined period.

3. In an apparatus for waving hair, a heating chamber, a curling member adapted to be positioned in said chamber, means to rotate the curling member to wind a lock of hair thereon, means to arrest the rotation of the curling member when the hair is wound thereon, and automatically actuated means to circulate a heating medium throughout the heating chamber.

4. In an apparatus for waving hair, a heating chamber, a curling member removably positioned in said chamber, means to rotate the curling member to wind a lock of hair thereon, and automatically actuated means to circulate a heating medium throughout the heating chamber.

5. In an apparatus for waving hair, a heating chamber, a curling member adapted to be positioned in said chamber, means for circulating a heating medium throughout the heating chamber, and automatically actuated means for regulating the duration of the circulation of the heating medium in the heating chamber.

6. In an apparatus for waving hair, a heating chamber, a curling member adapted to be positioned in said chamber, power means to rotate the curling member to wind a lock of hair thereon, means to circulate a heating medium throughout the heating chamber, and valve means for regulating the duration of the circulation of the heating medium in the heating chamber, said valve means being actuated by said power means.

7. In an apparatus for waving hair, a heating chamber, a curling member removably positioned in said chamber, means to connect said curling member with a source of power to wind a lock of hair on said member, and a conduit in communication with the heating chamber for allowing the passage of a heating medium into the heating chamber and automatically actuated means for regulating the duration of the circulation of the heating means.

3. In an apparatus for waving hair, a handle, a heating chamber adjacent one of the ends thereof, a curling member removably positioned in said chamber, conduits in said handle in communication with the chamber for circulating a heating medium in said chamber, and automatically actuated means for regulating the duration of the circulation of the heating medium.

9. In an apparatus for waving hair, a handle, a heating chamber adjacent one of the ends thereof, a curling member removably positioned in said chamber, conduits in said handle in communication with the chamber for circulating a heating medium in said chamber, and automatically actuated valve means for regulating the duration of the circulation of the heating medium.

10. In an apparatus for waving hair, a handle, a heating chamber adjacent one of the ends thereof, a drive shaft in said handle and projecting into said chamber, a curling member adapted to be secured to the drive shaft within said chamber, conduits in said handle in communication with the chamber for circulating the heating medium throughout said chamber, and valves positioned in said conduits for regulating the duration of the circulation of the heating medium, said valves being actuated by said drive shaft.

11. In an apparatus for waving hair, a handle, a heating chamber adjacent one of the ends thereof, a drive shaft in said handle and projecting into said heating chamber, a curling member adapted to be secured to said drive shaft within the heating chamber, conduits in said handle in communication with the chamber for circulating a heated vapor in said chamber, means in one of said conduits for superheating the vapor prior to its entry into said heating chamber, and valve means for regulating the duration of the circulation of the vapor in the heating chamber.

12. In an apparatus for waving hair, a handle, a heating chamber adjacent one of the ends thereof, a drive shaft in said handle and projecting into said heating chamber, a curling member adapted to be secured to said drive shaft within the heating chamber, conduits in said handle in communication with the chamber for circulating a heated vapor in said chamber, an electrical resistance in one of said conduits for superheating the vapor prior to its entry in said heating chamber, and valve means for regulating the duration of the circulation of the vapor in the heating chamber.

13. In an apparatus for waving hair, a handle, a heating chamber adjacent one of the ends thereof, a drive shaft in said handle and projecting into said heating member, a curling member adapted to be secured to said drive shaft within the heating chamber, conduits in said handle in communication with the chamber for circulating a heated vapor in said chamber, an electrical resistance in one of said conduits for superheating the vapor prior to its entry into said heating chamber, and valve means in said conduits for regulating the duration of the circulation of the vapor in the heating chamber, said valve means being actuated by said drive shaft.

14. In an apparatus for waving hair, a curling member, power actuated means to rotate said curling member to wind a lock of hair thereon, the rotation of the curling member being arrested when the hair is wound thereon, and means independent of said power actuated means to rotate the curling member.

15. In an apparatus for waving hair, a curling member, power actuated means to rotate the curling member to wind a lock of hair thereon, clutch means to disconnect the curling member from the power actuated means when the hair is wound thereon, and means independent of the power actuated means to rotate the curling member.

16. In an apparatus for waving hair, a curling member, power actuated means to rotate the curling member to wind a lock of hair thereon, clutch means to disconnect the curling member from the power actuated means when the hair is wound thereon, and manually operated means to rotate the curling member.

17. In an apparatus for waving hair, a drive shaft having a spindle on one end thereof, a curling member adapted to be fitted on said spindle, means to connect said drive shaft with a source of power and means to impart a step by step movement to said drive shaft.

18. In an apparatus for waving hair, a heating chamber, a curling member adapted to be positioned in said chamber, power means to rotate the curling member to wind a lock of hair thereon, the rotation of the curling member being arrested when the hair is wound thereon, means to circulate a heating medium throughout the heating chamber, and valve means for regulating the duration of the circulation of the heating medium in the heating chamber, said valve means being actuated by said power means.

19. In an apparatus for waving hair, a heating chamber, a curling member adapted to be positioned in said chamber, power means to rotate the curling member to wind a lock of hair thereon, means to circulate a medium throughout the heating chamber, means to superheat said heating medium prior to its entry into the heating chamber, and valve means for regulating the duration of the circulation of the heating medium in the heating chamber.

20. In an apparatus for waving hair, a heating chamber, a curling member adapted to be positioned in said chamber, power means to rotate the curling member to wind a lock of hair thereon, means to circulate a medium throughout the heating chamber, means to superheat said heating medium prior to its entry into the heating chamber, and valve means for regulating the duration of the circulation of the heating medium in the heating chamber, said valve means being actuated by power means.

21. In an apparatus for waving hair, a handle, a heating chamber adjacent one of the ends thereof, a drive shaft in said handle and projecting into said chamber, a curling member adapted to be secured to the drive shaft within said chamber, conduits in said handle in communication with the chamber for circulating the heating medium throughout said chamber, means to superheat said heating medium prior to its entry into the heating chamber, and means to regulate the duration of the circulation of the heating medium.

22. In an apparatus for waving hair, a handle, a heating chamber adjacent one of the ends thereof, a drive shaft in said handle and projecting into said chamber, a curling member adapted to be secured to the drive shaft within said chamber, means in said handle in communication with the chamber for circulating the heating medium throughout said chamber, and means for regulating the duration of the circulation of the heating medium, said last mentioned means being actuated by the drive shaft.

23. In an apparatus for waving hair, a curling member, power driven means to rotate the curling member to wind a lock of hair thereon, clutch means to disconnect the curling member from the power actuated means when the hair is wound thereon, and means independent of the power actuated means to impart a step by step movement to the curling member.

24. In an apparatus for waving hair, a curling member, power driven means to rotate the curling member to wind a lock of hair thereon, clutch means to disconnect the curling member from the power actuated means when the hair is wound thereon, and manually operated means to impart a step by step movement to the curling member.

25. In an apparatus for waving hair embodying a handle member provided with a heating chamber at one end thereof, said heating chamber comprising a cylinder open at one end and slidably mounted on the handle, a longitudinal slot for the cylinder, a split sleeve rotatable around the cylinder to close the slot, a shutter for the open end of said cylinder and means to operate simultaneously said shutter and sleeve.

26. In an apparatus for waving hair embodying a handle member provided with a heating chamber at one end thereof, said heating chamber comprising a cylinder open at one end and slidably mounted on the handle, a longitudinal slot for the cylinder, a split sleeve rotatable around the cylinder for closing the slot, a pivoted shutter for the open end of said cylinder, and means to operate simultaneously said shutter and sleeve.

27. In an apparatus for waving hair embodying a handle member provided with a heating chamber at one end thereof, said heating chamber comprising a cylinder open at one end and slidably mounted on the handle, a longitudinal slot for the cylinder, a split sleeve rotatable around the cylinder for closing the slot, a shutter for the open end of said cylinder, and a single means to operate simultaneously said shutter and sleeve.

28. In an apparatus for waving hair embodying a handle member provided with a heating chamber at one end thereof, said heating chamber comprising a cylinder open at one end and slidably mounted on the handle, a longitudinal slot for the cylinder, a split sleeve rotatable around the cylinder for closing the slot, a shutter for the open end of said cylinder, and means to cause simultaneously the cylinder to slide on the handle member, the shutter to close the open end of the cylinder and the sleeve to close the slot.

FERNAN O. CONILL.